Figure 1:
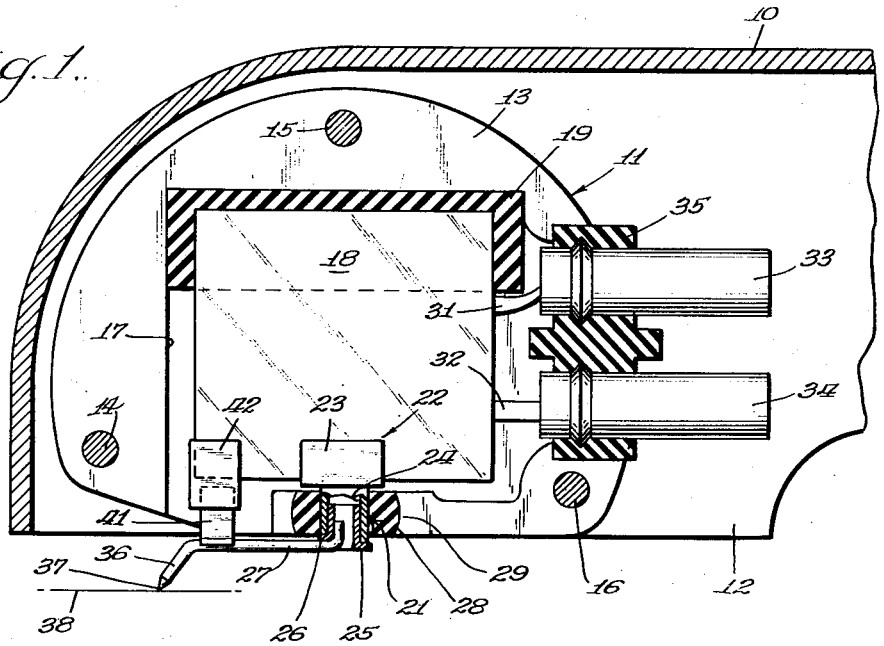

Sept. 4, 1951  R. H. DREISBACH  2,567,105

CRYSTAL PICKUP

Filed March 11, 1949

INVENTOR.
Robert H. Dreisbach
BY
Clarence J. Loftus
Atty.

Patented Sept. 4, 1951

2,567,105

UNITED STATES PATENT OFFICE 2,567,105

CRYSTAL PICKUP

Robert H. Dreisbach, Fort Wayne, Ind., assignor to The Magnavox Company, Fort Wayne, Ind., a corporation of Delaware Application March 11, 1949, Serial No. 80,909

7 Claims. (Cl. 179—100.41)

One of the most troublesome factors encountered in the design and construction of phonograph pickups arises from the effects of undesired vibration at the frequencies of natural resonance of the operating parts of the mechanism, and it is the primary object of this invention to eliminate the unwanted vibrations without seriously detracting from the efficiency of the pickup unit.

The unwanted vibrations comprise two principal components: the first being due to the self-resonance of the stylus itself and the second being because the stylus has a degree of compliance such that the resonance of it with the mass of the tone arm results in a tendency for the entire tone arm to vibrate. The first of these factors causes an undesired peak in the output curve of the pickup that is fatal to high fidelity reproduction, and the second causes a loss of tracking force on the stylus tip corresponding to the resonance of the tone arm. In pickups of modern design adapted to function at a very low tracking weight the effects of this type of vibration on the force exerted by the stylus tip are so great as to become the limiting factor in determining the required tracking weight for the pickup. The problems involved in overcoming these difficulties have long been known but have never heretofore been solved in a satisfactory manner, for while it has been proposed to employ damping material between the stylus and some fixed part of the tone arm or pickup cartridge to reduce unwanted vibrations this has heretofore resulted in a serious loss of efficiency of the device, and has so lowered the output voltage of the crystal or other electro-mechanical converter as to defeat the designers' original purpose. This is because the amount of energy imparted to the stylus by the record is quite small at best, and when damping material is placed between the stylus and some fixed part of the pickup case or tone arm a substantial portion of this energy is transmitted to the damping material and is lost.

The problem is solved according to the present teaching by the provision of a novel mechanical expedient whereby damping material is applied to the stylus in such a manner as to damp not only its self-resonant vibration but also largely eliminate the vibration of the tone arm, yet to do this without serious loss of energy. It is done by placing the damping material between the stylus and the crystal itself rather than a fixed portion of the cartridge, so that the energy absorbed by the damping material is fed back to the crystal to combine with the energy transmitted directly to the crystal by the stylus. For best results, the damping material is secured to the crystal at a point of lower mechanical impedance than the direct connection of the stylus, so that a relatively large amount of the energy transmitted from the stylus to the damping material is in turn transmitted to the crystal and converted into electrical energy. Thus the damping material accomplishes its purpose of eliminating unwanted vibrations, but the energy transmitted to it is not completely lost but is converted into electrical energy contributing to the total output of the pickup.

Figure 2:
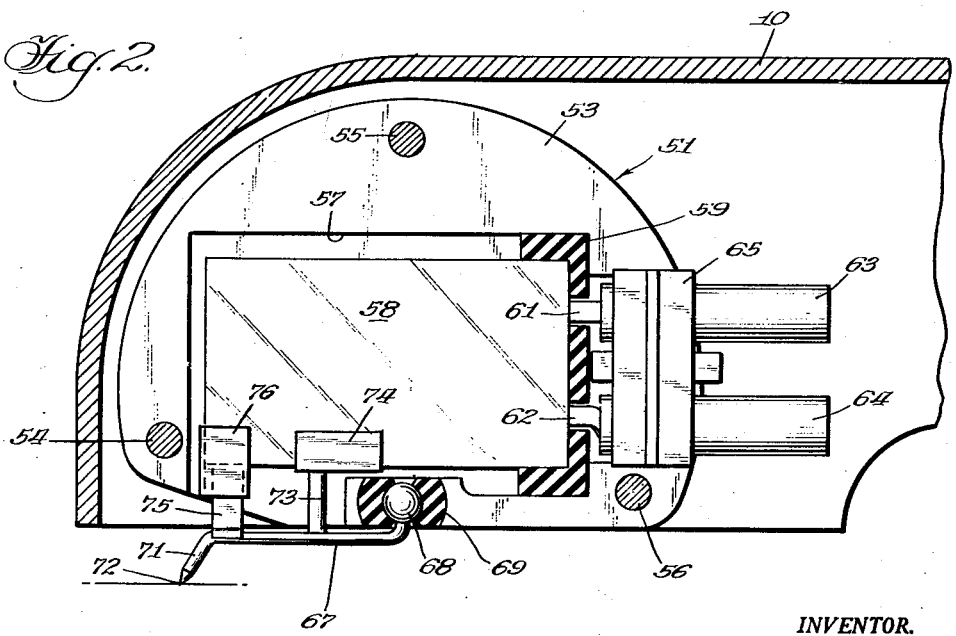

The present preferred embodiment of the invention is illustrated in the drawings of this specification, wherein:

Figure 1 is a central sectional view of a tone arm and pickup cartridge showing the manner in which the present teachings are utilized with a crystal of the "twister" type; and Figure 2 is a sectional view similar to Figure 1 but showing a modified form of the invention in which a crystal of the "bender" type is employed with a somewhat different driving connection between the stylus and crystal.

In the form of the invention shown in Figure 1 the tone arm 10 is hollow and supports the pickup cartridge generally indicated at 11 between its opposite side walls 12.

The cartridge 11 has a housing consisting of two oppositely disposed shells 13 secured together in any convenient manner as by the rivets or machine screws 14, 15 and 16. The shells each have an inside cavity 17 and the crystal 18 is mounted within the cavity by clamping the upper edge of the crystal in a resilient mounting block 19. The crystal 18 is of the type adapted to be energized by twisting it upon a vertical axis at its center line. The lower end of the crystal is secured in a primary crystal driving member generally indicated at 22. This driving member 22 includes a pair of opposite flanges 23 clamped to the opposite sides of the crystal, and with a supporting bearing 21 in the form of a hollow sleeve having an interior bore 24 in which the stylus holder 25 is fitted. The stylus holder 25 is frictionally secured within the bore and is provided with a key 26 fitted in a keyway of the bearing sleeve 21 so that the stylus 27, which is soldered or otherwise secured in the holder 25 will be held in properly oriented relationship to the crystal.

The bearing sleeve 21 is mounted in a resilient rubber ring 28, which is clamped between generally spherical surfaces 29 formed on the opposite halves of the casing so that when the cartridge casing is assembled the bearing 21 will be held firmly, yet resiliently, in the rubber ring. The crystal is provided with electrical connections 31 and 32 leading to contact terminal pins 33 and 34 respectively and these pins are both mounted in an insulated block 35 so that the pins project out of the cartridge to provide for connections to the amplifier of the phonograph. The stylus 27 extends forwardly from the crystal bearing and stylus holder in a direction perpendicular to the vertical axis of the crystal and includes a downwardly extending portion 36 at its extreme forward end terminating in a stylus tip or point 37 adapted to engage the surface 38 of a phonograph record.

From the foregoing it will be seen that the vibratory movements imparted to the tip 37 of the stylus by the record will be transmitted to the crystal through a primary driving connection including the stylus holder 25 and crystal driving member 22. The driving member 22 is in engagement with the crystal on its vertical axis where the mechanical impedance presented by the crystal is at its maximum so that the vibratory movements of the stylus tip 37 are applied to the crystal directly at this point. According to the present invention, however, the forward portion of the stylus 27 is engaged by a resilient piece of damping material 41 at a point between the stylus holder 25 and the tip 37 of the stylus. The damping material 41 is supported in a flanged fitting 42 clamped to the lower forward corner of the crystal 18. In this position the damping material 41 is effective to prevent undesired vibration of the stylus at its point of self-resonance and is also effective to overcome any tendency of the entire tone arm and stylus to vibrate as a system, but it is important to note that the mechanical energy imparted to the damping material by the movement of the stylus is not lost but is transmitted through the fitting 42 to the crystal 18. Thus while the stylus 27, stylus holder 25 and crystal driving member 22 comprise a primary driving connection between the stylus tip and the crystal, the damping material 41 and fitting 42 act as a secondary driving connection including means for damping the self-resonance of the stylus. This secondary connection transmits the energy received from the stylus to a forward corner of the crystal rather than to a point on its axis and since the crystal presents a lower mechanical impedance at this corner than at the mounting of the primary crystal driving member 22 the energy transmitted through the damping material is utilized quite effectively and combines with the energy transmitted through the primary crystal driving member to result in a voltage output representing the sum total of energy received through both the primary and secondary driving connections. Thus, although the damping material 41 is effective to overcome unwanted vibration at the point of resonance of the tone arm or at the self-resonant point of the stylus, yet it accomplishes these two functions without substantial loss of mechanical energy transmitted to the crystal and therefore without significant reduction of the electrical output of the crystal.

In the form of the invention illustrated in Figure 2 the principles of the present teaching are applied to a pickup cartridge designed to employ a crystal of the "bender" type with a modified form of driving connection between the stylus and the crystal. In this embodiment the tone arm 10 has a cartridge 51 comprising two opposite shells 53 secured together by the machine screws 54, 55 and 56. These shells enclose a crystal 58 mounted in horizontal position in the cavity 57, with one end of the crystal secured in the resilient mounting block 59. Electrical connections 61 and 62 are provided to the contact pins 63 and 64 which are secured in an insulating piece 65 in the same manner as previously described.

In this form of the invention the stylus 67 is mounted on a ball portion 68 clamped in the resilient rubber bearing ring 69.

The forward end of the stylus has a downwardly inclined portion 71 terminating in the stylus tip or playing point 72. The primary driving connection from the stylus 67 to the crystal comprises a rigid post 73 extending upwardly from the stylus 67 to a flanged crystal driving member 74. The secondary driving connection and damping means for the stylus consists of a piece of resilient damping material 75 engaging the stylus and carried by a bracket 76 clamped to the crystal at its lower forward corner. With this arrangement it will be seen that the primary driving connection from the stylus tip to the crystal is completed through the rigid connections 73 and 74 and transmits the energy of the stylus to the crystal at a point intermediate its opposite ends. The secondary driving connection includes the resilient damping material 75 as well as the mounting bracket 76 and transmits the energy imparted to the damping material to the crystal at its extreme end, where the mechanical impedance of the crystal is less than at points intermediate its ends.

Thus while the forms of the invention shown in Figures 1 and 2 are adapted to employ different types of crystals, they function in essentially the same manner in that each provides a compliant stylus with a damping device so arranged as to feed most of the energy it absorbs back into the crystal to increase the output energy of the cartridge.

The forms of the invention shown are the present preferred embodiments of these teachings, but with knowledge of the principles thereof it will be obvious that various other modifications and variations of the inventon may be employed without departing from the inventive concept here disclosed.

It is accordingly pointed out that the forms of the invention here illustrated and described are illustrative only, and that the concept of the present teachings is not limited to the precise structure shown but extends equally to any variation or modification thereof within the scope of the appended claims.

Having thus described the invention, what I claim as new and desire to protect by United States Letters Patent is:

1. In a phonograph pickup, in combination, a crystal, a stylus, a primary driving connection from the stylus to the crystal of relatively rigid material, and a secondary driving connection from the stylus to the crystal of damping material yieldable relative to that of said primary driving connection; said secondary connection extending from the stylus to the crystal at a point intermediate the primary driving connection and the stylus tip.

2. In a phonograph pickup, in combination, a crystal, a stylus, a primary driving connection from the stylus to the crystal of relatively rigid material, and a secondary driving connection from the stylus to the crystal of damping material yieldable relative to that of said primary driving connection.

3. In a phonograph pickup, in combination, a crystal, a stylus, a primary driving connection from the stylus to the crystal at a point of relatively high mechanical impedance on the crystal, and a secondary driving connection from the stylus to the crystal at a point of lower mechanical impedance than the primary connection; said secondary driving connection including means for damping the self-resonance of the stylus and consisting of a section of material yieldable relative to that of said primary driving connection and extending from the stylus to the crystal at a point intermediate the primary crystal drive and the stylus tip.

4. In a phonograph pickup, in combination, a crystal, a stylus, a primary driving connection from the stylus to the crystal at a point of relatively high mechanical impedance on the crystal, and a secondary driving connection from the stylus to the crystal at a point of lower mechanical impedance than the primary driving connection; said secondary driving connection including means for damping the self-resonance of the stylus and consisting of a section of material yieldable relative to that of said primary driving connection and extending from the stylus to the crystal.

5. In a phonograph pickup, in combination, a crystal, a stylus, a primary driving connection from the stylus to the crystal at a point of relatively high mechanical impedance on the crystal, and a secondary driving connection from the stylus to the crystal at a point of lower mechanical impedance than the primary driving connection; said secondary driving connection including means for damping the self-resonance of the stylus.

6. In a phonograph pickup, in combination, a crystal, a stylus, a primary driving connection from the stylus to the crystal at a point of relatively high mechanical impedance on the crystal, and a secondary driving connection from the stylus to the crystal at a point of lower mechanical impedance than the primary driving connection.

7. In a phonograph pickup, in combination, a crystal, a stylus, a primary driving connection from the stylus to the crystal, means for damping the self-resonance of the stylus, and means separate from the primary driving connection for transmitting energy from said damping means to the crystal to increase its sensitivity.

ROBERT H. DREISBACH.

REFERENCES CITED

The following references are of record in the file of this patent:

UNITED STATES PATENTS

| Number | Name | Date |
| --- | --- | --- |
| 1,520,378 | Waters | Dec. 23, 1924 |
| 2,286,178 | Kornei | June 9, 1942 |
| 2,363,497 | Begun | Nov. 28, 1944 |
| 2,451,221 | Hutter | Oct. 12, 1948 |
| 2,452,304 | Hutter | Oct. 26, 1948 |